(12) United States Patent
Appleton et al.

(10) Patent No.: US 7,103,952 B2
(45) Date of Patent: Sep. 12, 2006

(54) ENGINE LOADER AND TRANSPORTER APPARATUS AND METHODS

(75) Inventors: Joseph A. Appleton, Arlington, WA (US); Timothy J. Busch, Marysville, WA (US); Keith E. Black, Snohomish, WA (US); Kevin P. Wescott, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 10/799,157

(22) Filed: Mar. 12, 2004

(65) Prior Publication Data

US 2005/0198797 A1     Sep. 15, 2005

(51) Int. Cl.
B66B 9/16    (2006.01)
B66B 9/187   (2006.01)
B60P 1/64    (2006.01)
B60P 1/44    (2006.01)

(52) U.S. Cl. .................. 29/281.4; 29/401.1; 29/464; 29/468; 29/281.1; 254/2 R; 254/122; 244/54; 414/589

(58) Field of Classification Search ............ 29/801.1, 29/464, 468, 281.1, 281.4; 254/2 R, 122; 244/54; 414/589
See application file for complete search history.

(56) References Cited

U.S. PATENT DOCUMENTS

| 2,815,184 | A |   | 12/1957 | Westphal et al. |
| 2,931,519 | A | * | 4/1960  | Beach ................... 414/589 |
| 3,128,840 | A |   | 4/1964  | Barrett, Jr. |
| 3,570,227 | A |   | 3/1971  | Bellinger |
| 3,744,586 | A |   | 7/1973  | Leinauer |
| 4,082,195 | A | * | 4/1978  | Wnek .................... 414/352 |
| 4,175,638 | A |   | 11/1979 | Christensen |
| 4,372,407 | A |   | 2/1983  | McColl |
| 4,412,774 | A | * | 11/1983 | Legrand et al. ........ 414/589 |
| 4,440,265 | A | * | 4/1984  | Spagnoli ............... 182/129 |
| 4,447,186 | A | * | 5/1984  | Renfro et al. .......... 414/589 |
| 4,461,455 | A | * | 7/1984  | Mills et al. ............ 254/3 R |
| 4,522,548 | A | * | 6/1985  | Oswald et al. ......... 414/458 |
| 4,660,796 | A | * | 4/1987  | Garrec ................... 248/544 |
| 4,690,606 | A | * | 9/1987  | Ross ..................... 414/495 |
| 4,823,899 | A |   | 4/1989  | Ron |
| 4,919,224 | A |   | 4/1990  | Shyu et al. |
| 5,083,629 | A |   | 1/1992  | Chang |
| 5,222,568 | A |   | 6/1993  | Higasa et al. |
| 5,575,607 | A | * | 11/1996 | Grout et al. ........... 414/589 |
| 5,609,220 | A |   | 3/1997  | Moriya et al. |
| 5,722,512 | A | * | 3/1998  | Lilja et al. ............. 187/244 |
| 6,019,565 | A | * | 2/2000  | Gesuale ................ 414/458 |
| 6,485,247 | B1| * | 11/2002 | Groves et al. ......... 414/589 |

* cited by examiner

Primary Examiner—David P. Bryant
Assistant Examiner—Christopher Agrawal
(74) Attorney, Agent, or Firm—Lee & Hayes PLLC

(57) ABSTRACT

Engine loader and transporter apparatus and methods are disclosed. In one embodiment, an engine handling assembly includes a motorized drive assembly engageable with a floor surface, and an engagement unit positioned proximate the drive assembly and partially surrounding a working space. The engagement unit includes a pair of coupling assemblies positioned on opposing lateral sides of the working space that are adapted to be selectively coupleable to the aircraft engine assembly when the aircraft engine assembly is positioned at least partially within the working space. A lifting assembly is operatively coupled to the drive assembly and to the engagement unit and is operable to selectively raise and lower the engagement unit and the aircraft engine assembly with respect to the floor surface.

31 Claims, 14 Drawing Sheets

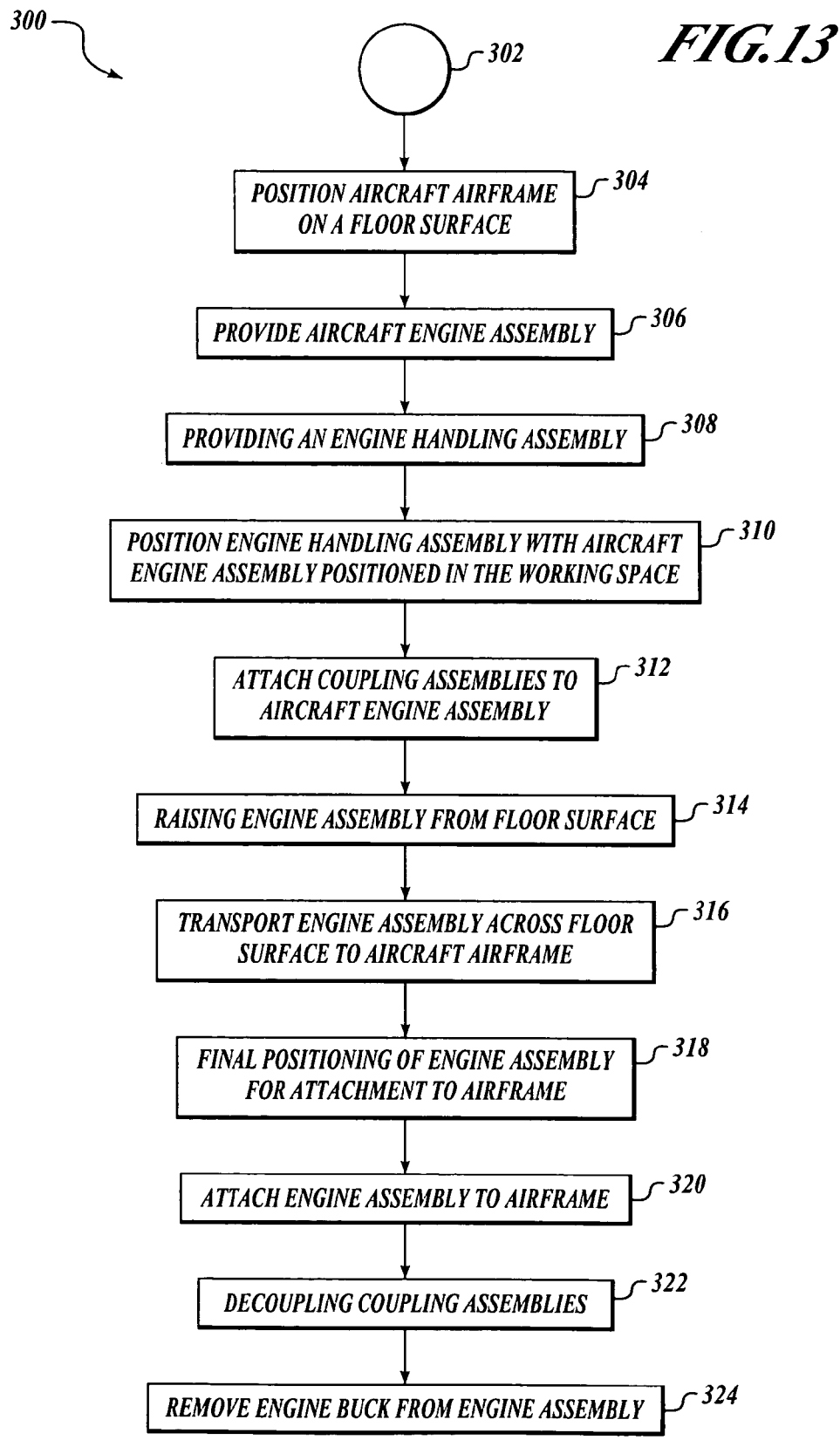

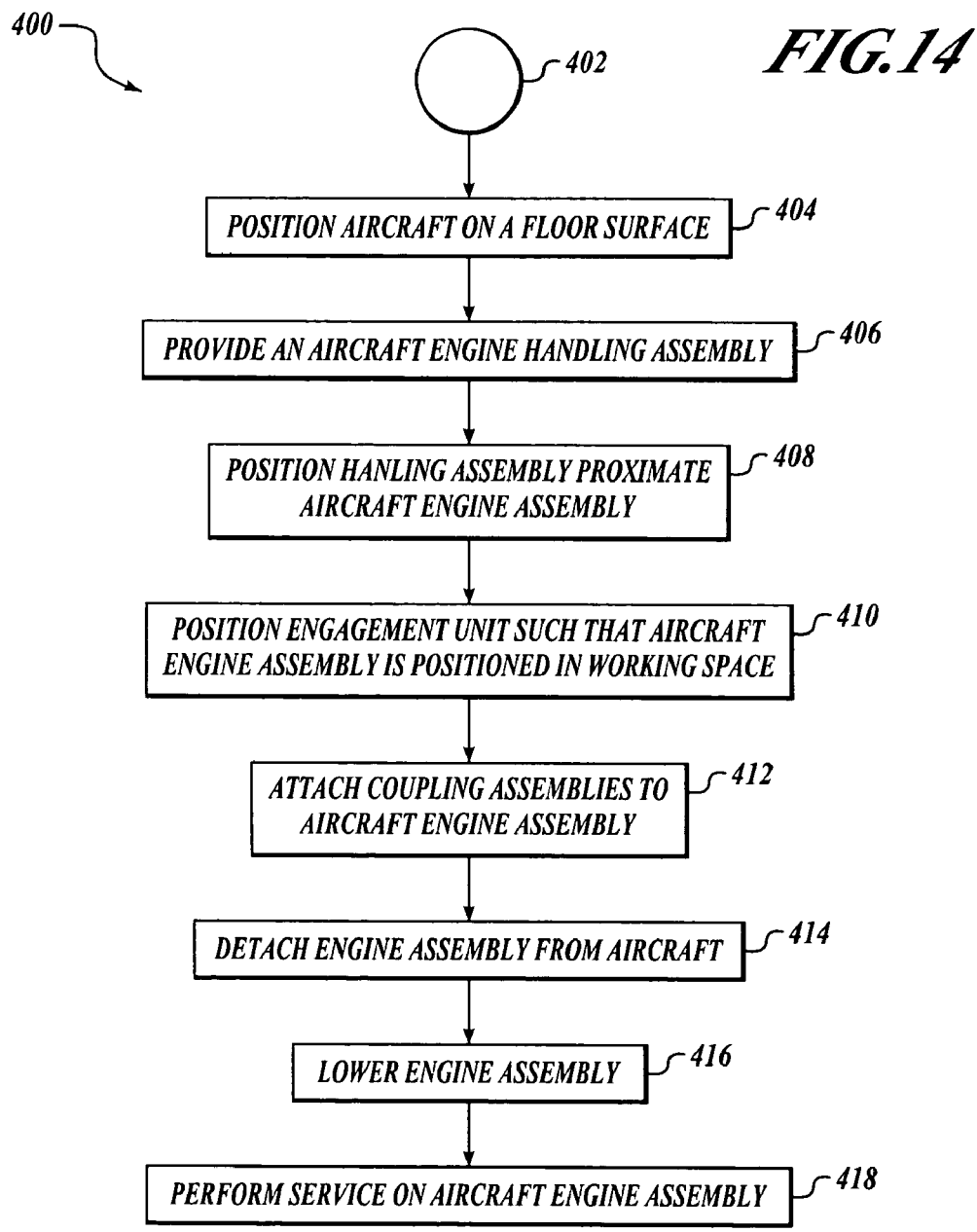

ENGINE LOADER AND TRANSPORTER APPARATUS AND METHODS

FIELD OF THE INVENTION

The present disclosure relates to apparatus and methods for handling aircraft engines, and more specifically, to engine loader and transporter apparatus and methods.

BACKGROUND OF THE INVENTION

Throughout the aviation industry, the handling of aircraft engines presents a significant challenge. For example, during manufacturing of large commercial aircraft, aircraft engines weighing in excess of 20,000 pounds must be positioned precisely with respect to the aircraft airframe during the attachment process. Similarly, aircraft engines must be periodically removed for servicing and maintenance by airlines, aircraft service providers, and various military organizations. Thus, the need to remove, transport, and install aircraft engines presents a significant challenge in a wide variety of applications.

Typically, an engine is installed by lifting the engine upwardly into position and securing it to a portion of an airframe, such as a wing, a wing pylon, or a suitable portion of the aircraft fuselage. The installation (and removal) process is typically very complex, and usually involves precise positioning of the engine with respect to the airframe. Known techniques for handling aircraft engines include the use of overhead cranes, slings, or a variety of known loader apparatus. Conventional loader apparatus for handling aircraft engines include, for example, those devices disclosed in U.S. Pat. No. 6,485,247 B1 issued to Groves et al., U.S. Pat. No. 5,575,607 issued to Grout et al., U.S. Pat. No. 4,461,455 issued to Mills et al., and U.S. Pat. No. 2,815,184 issued to Westphal et al.

Although desirable results have been achieved using such prior art apparatus and methods, there is room for improvement. For example, some types of conventional engine handling apparatus must be positioned below the aircraft engine in order to support the engine during installation and removal. This may undesirably necessitate lifting of the aircraft in order to provide enough space between the aircraft engine and the floor or other supporting surface for the engine handling apparatus to operate.

Other types of conventional engine handling apparatus may include support members that project upwardly above the aircraft engine in order to provide support for lifting the engine by means of chains, slings, or other suitable attachment devices. Such upwardly projecting support members may undesirably interfere with nearby portions of the airframe, such as the engine nacelle or thrust reverse assembly. Still other conventional types of engine handling apparatus require that the engine be uncoupled from its shipping buck, transported to a position proximate the airframe, and then be engaged onto support rails in order to be slidably moved into position with respect to the airframe. Due to the size, weight, and complexity of modem aircraft engines, such conventional engine handling apparatus obviously involve an undesirable amount of handling and transferring of the aircraft engine. Therefore, novel apparatus and methods for loading and transporting aircraft engines that at least partially mitigate the above-noted undesirable aspects of the prior art would be useful.

SUMMARY OF THE INVENTION

The present invention is directed to apparatus and methods for transporting and loading aircraft engines. Embodiments of apparatus and methods in accordance with the present invention may advantageously reduce the time, labor, and expense associated with conventional aircraft engine handling apparatus and methods.

In one embodiment an engine loader and transport assembly includes a motorized drive assembly engageable with a floor surface, and an engagement unit positioned proximate the drive assembly and partially surrounding a working space. The engagement unit includes a pair of coupling assemblies positioned on opposing lateral sides of the working space that are adapted to be selectively coupleable to the aircraft engine assembly when the aircraft engine assembly is positioned at least partially within the working space. A lifting assembly is operatively coupled to the drive assembly and to the engagement unit and is operable to selectively raise and lower the engagement unit and the aircraft engine assembly with respect to the floor surface.

BRIEF DESCRIPTION OF THE DRAWINGS

The preferred and alternative embodiments of the present invention are described in detail below with reference to the following drawings.

FIG. 13 is a schematic view of a method of installing an engine assembly onto an aircraft in accordance with another embodiment of the invention; and FIG. 14 is a schematic view of a method of removing an engine assembly from an aircraft in accordance with an alternate embodiment of the invention.

DETAILED DESCRIPTION OF THE INVENTION

The present invention relates to apparatus and methods for loading and transporting aircraft engines. Many specific details of certain embodiments of the invention are set forth in the following description and in FIGS. 1–14 to provide a thorough understanding of such embodiments. One skilled in the art, however, will understand that the present invention may have additional embodiments, or that the present invention may be practiced without several of the details described in the following description.

Figure 1:
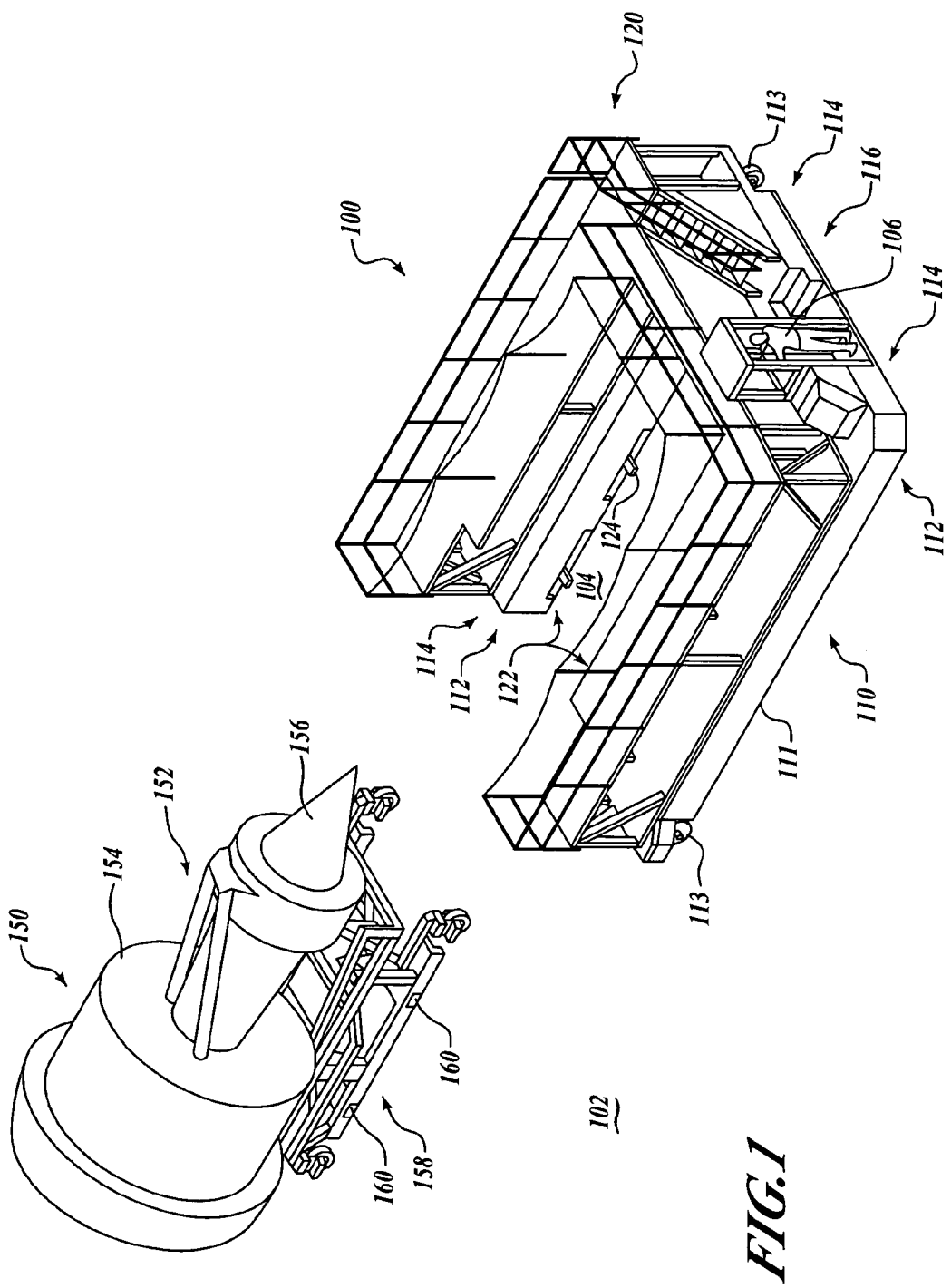
FIG. 1 is an isometric view of an engine loader and transport assembly disengaged from an aircraft engine assembly in accordance with an embodiment of the present invention.
Figure 2:
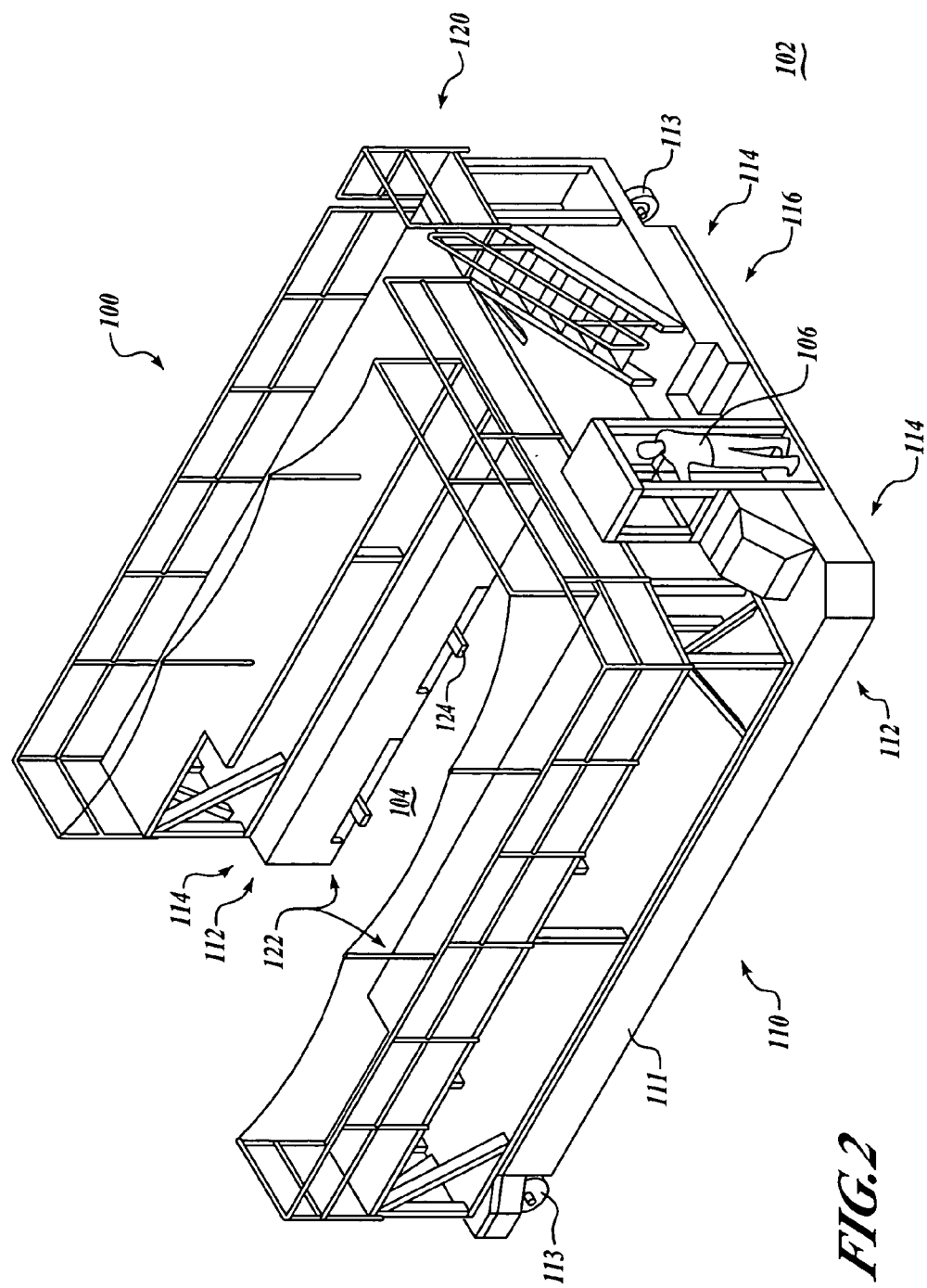
FIG. 2 is an enlarged isometric view of the engine loader and transport assembly of FIG. 1.
Figure 3:
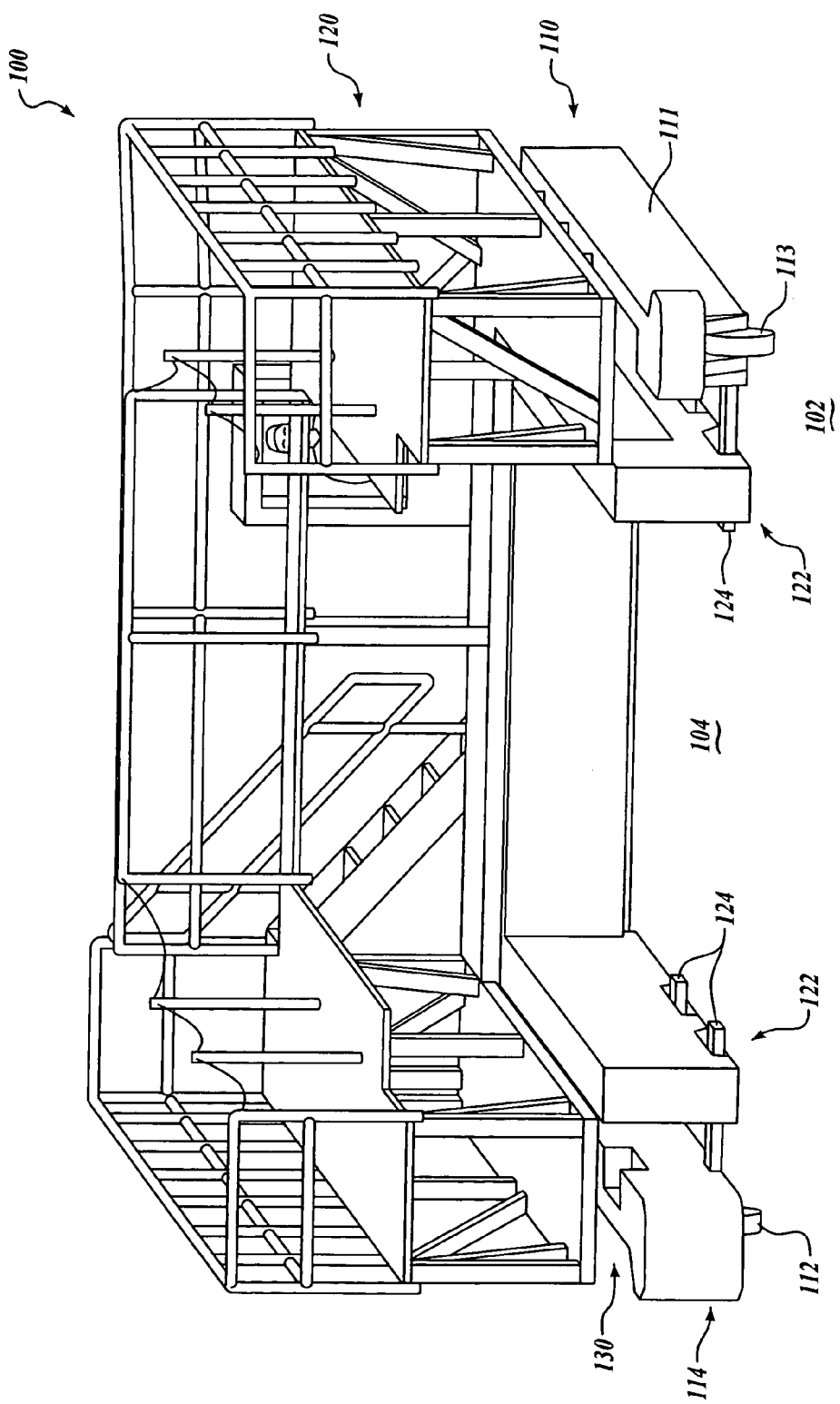
FIG. 3 is another enlarged isometric view of the engine loader and transport assembly of FIG. 1.

FIG. 1 is an isometric view of an engine loader and transport assembly 100 in accordance with an embodiment of the present invention. In FIG. 1, the engine loader and transport assembly 100 is shown disengaged from an aircraft engine assembly 150. FIGS. 2 and 3 are rearward and forward isometric views, respectively, of the engine loader and transport assembly 100 of FIG. 1. As shown in FIGS. 1–3, the engine loader and transport assembly 100 includes a drive assembly 110 that engages a floor surface 102, and an engine engagement unit 120 movably coupled to the drive assembly 110 by a lift assembly 130 (FIG. 3). In this embodiment, both the drive assembly 110 and the engine engagement unit 120 are substantially U-shaped assemblies that define a working space 104.

Figure 4:
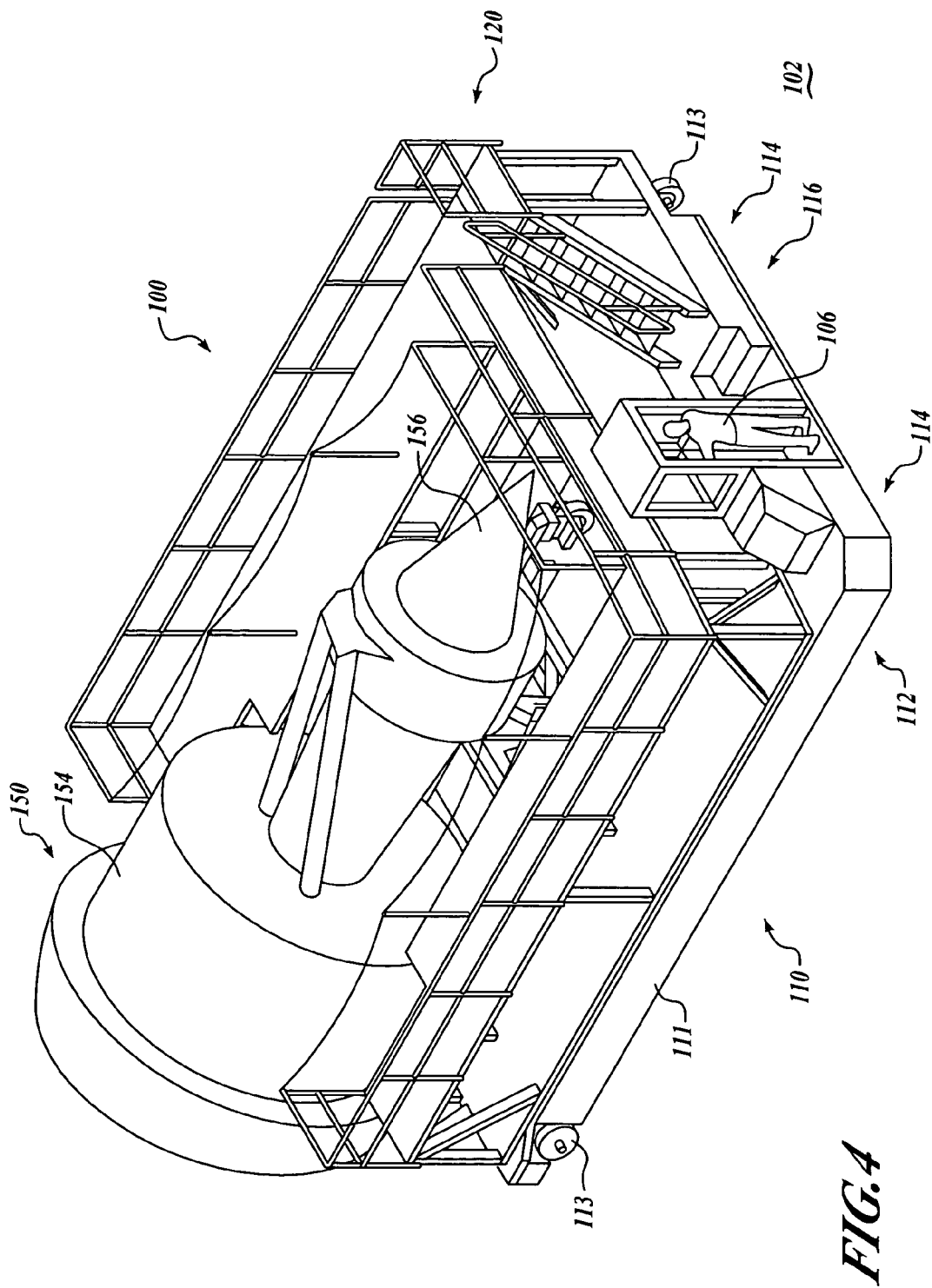
FIG. 4 is an enlarged isometric view of the engine loader and transport assembly of FIG. 1 engaged with the aircraft engine assembly.

FIG. 4 is an enlarged isometric view of the engine loader and transport assembly 100 of FIG. 1 engaged with the aircraft engine assembly 150. As described more fully below, with the aircraft engine assembly 150 positioned in the working space 104, the engine engagement unit 120 may be secured to the aircraft engine assembly 150. The aircraft engine assembly 150 may then be raised from the floor surface 102 using the lift assembly 130, and may be moved into a desired position on the floor surface 102 using the drive assembly 110. The lift assembly 130 of the engine engagement unit 120 may then be used to precisely position the aircraft engine assembly 150 into engagement with an airframe or other engine support assembly (not shown). These tasks may all be accomplished by a single operator 106.

Referring again to FIG. 1, in this embodiment, the aircraft engine assembly 150 includes an aircraft engine 152 having a relatively-larger diameter turbofan portion 154, and a relatively-smaller diameter turbojet portion 156. An engine support (or engine buck) 158 is coupled to the aircraft engine 152 and rollably supports the aircraft engine 152 on the floor surface 102. In this embodiment, the engine support 158 is a conventional device that is coupled to the aircraft engine 152 by the engine manufacturer for supporting the aircraft engine 152 during transport and storage. In this embodiment, the engine support 158 includes slots 160 disposed within a lower portion thereof. Conventionally, the slots 160 are adapted to receive the forks of a forklift (not shown), thereby enabling the aircraft engine assembly 150 to be picked up and moved using a forklift. Although the aircraft engine assembly 150 depicted in FIG. 1 is generally representative of a GE-90-115B aircraft engine assembly commercially-available from General Electric Aircraft Engines, Inc. of Evandale, Ohio, it will be appreciated that the inventive apparatus and methods disclosed herein are not limited to the particular embodiment of the aircraft engine assembly 150 shown in FIG. 1.

In one embodiment, the drive assembly 110 is based on a known multi-directional drive wheel system that is capable of moving over the floor surface 102 in any desired direction. In one particular embodiment, the drive assembly 110 includes a support frame 111 having one or more drive wheels 112 operatively coupled to one or more electric drive motors 114 that are stored on board the support frame 111. Both the drive and non-drive wheels 112, 113 may be canted in a conventional manner to allow the drive assembly 110 to be moved over the floor surface 102 in forward and aft directions, left and right lateral directions, and in a crab-like mode of operation, in any desired angular direction. The operator 106 may control the drive assembly 110 from a control station 116. In one particular embodiment, the drive assembly 110 may-be based on an omni-directional drive system commercially-available from MaxMove, AB of Bjurholm, Sweden, however, in alternate embodiments, any suitable multi-directional drive wheel system may be employed. In another aspect, the drive assembly 100 may include a control system which may be programmed for automated or semi-automated movement over the floor surface 102, as disclosed, for example, in International Publication Number WO 99/54190, incorporated herein by reference. The automatic program feature is used during the engine installation process and may advantageously allow the aircraft assembly 150 to be automatically positioned in a desired position that will allow for the tip/tilt feature to align to the strut angle and attitude configuration in a timely manner.

Figure 5:
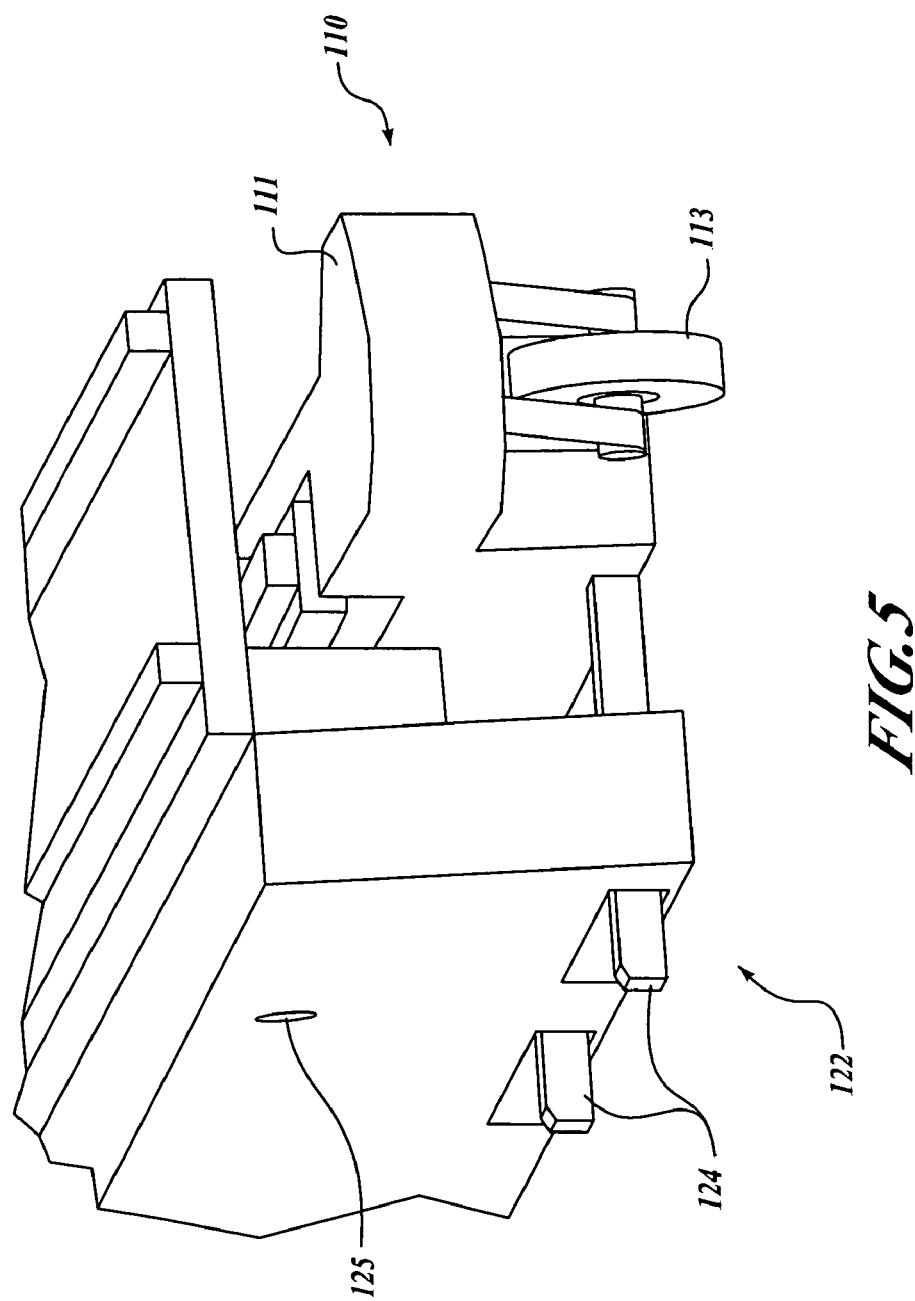
FIG. 5 is an enlarged, partial isometric view of a portion of an engine engagement unit of FIG. 1 in accordance with an embodiment of the invention.

As mentioned above, the engine engagement unit 120 may be selectively coupled with (and de-coupled from) the aircraft engine assembly 150. More specifically, the engine engagement unit 120 includes a pair of coupling assemblies 122 positioned on opposing sides of the working space 104 (FIG. 3). FIG. 5 is an enlarged, partial isometric view of a portion of the engine engagement unit 120 of FIG. 1 showing the coupling assembly 122. In this embodiment, each coupling assembly 122 includes a pair of elongated members (or prongs) 124. The elongated members 124 may be controllably projected into, and retracted from, the working space 104. In one embodiment, the elongated members 124 may be hydraulically actuated during the projection into and retraction from the working space 104, and further, may be moveable along the opposing sides of the working space 104 by electrically-driven screw drive actuators. In one specific embodiment, the elongated members 124 may be substantially similar in size and shape to the lifting forks of a conventional forklift. As further shown in FIG. 5, the engagement unit 120 pivots (or pitches) about a pair of pivot points 125 (one shown) positioned between the elongated members 124 of the coupling assemblies 122.

It will be appreciated that the coupling assemblies 122 may be varied from the particular embodiment described above and shown in the company figures. For example, in alternate embodiments, the engine buck 158 may not be equipped with slots 160, but rather, may consist of a rail or beam as disclosed, for example, in U.S. Pat. No. 4,412,774 issued to Legrand et al., and in U.S. Pat. No. 4,440,265 issued to Spagnoli, incorporated herein by reference. In alternate embodiments, the elongated members 124 of the coupling assemblies 122 may be suitably adapted to engage with (and disengage from) any type of rail or beam. More specifically, in alternate embodiments, the elongated members 124 may be equipped with suitable brackets, clamps, angled members, or other suitable engagement portions adapted to engage with any type of rail or beam depending on the particular configuration of the engine buck 158.

Figure 6:
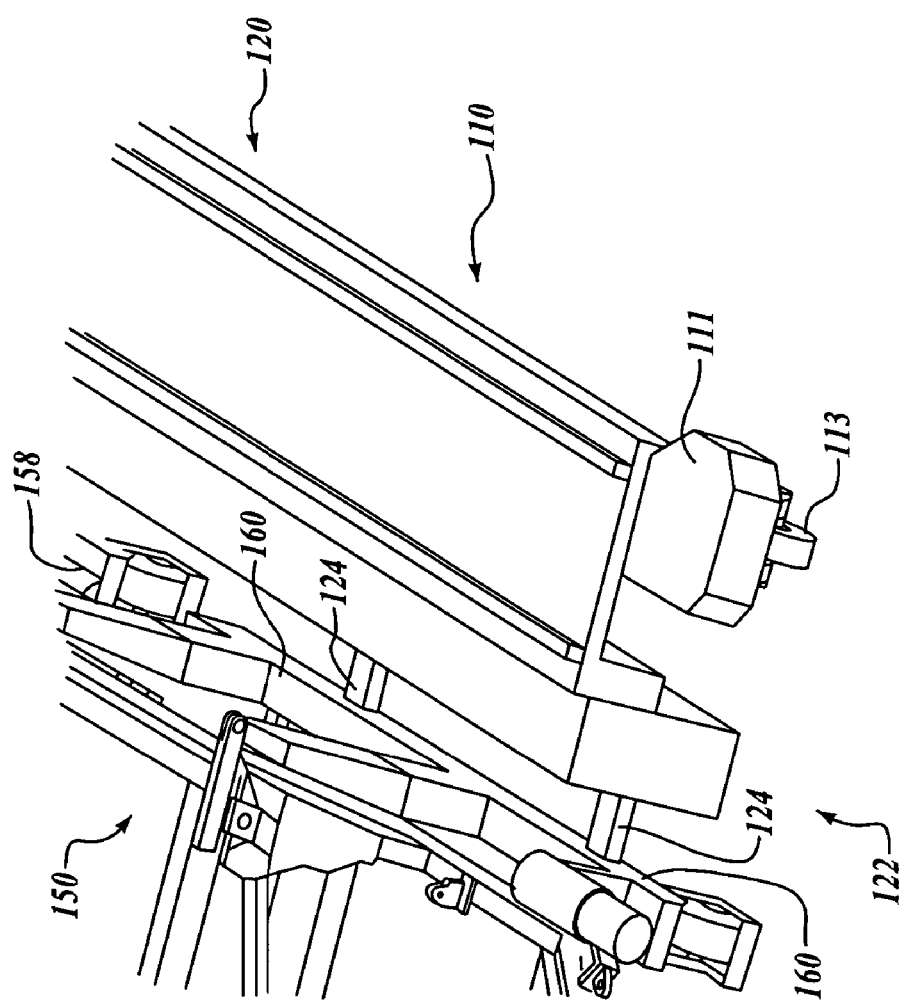
FIG. 6 is an enlarged, partial isometric view of the engine engagement unit of FIG. 5 engaged with the aircraft engine assembly.

FIG. 6 is an enlarged, partial isometric view of the coupling assembly 122 of FIG. 5 engaged with the aircraft engine assembly 150. In operation, the engine load or and transport assembly 100 may be positioned proximate the aircraft engine assembly 150 using the drive assembly 110, as shown in FIG. 4. With the coupling assemblies 122 properly positioned with respect to the engine support 158, the operator 106 may controllably extend the elongated members 124 into the slots 160 of the engine support 158. The aircraft engine assembly 150 may then be picked up and moved using the engine loader and transport assembly 100, as described more fully below. After the aircraft engine assembly 150 has been moved into a desired position, the operator 106 may retract the elongated members 122 from the slots 160, thereby disengaging the engine loader and transport assembly 100 from the aircraft engine assembly 150.

Figure 7:
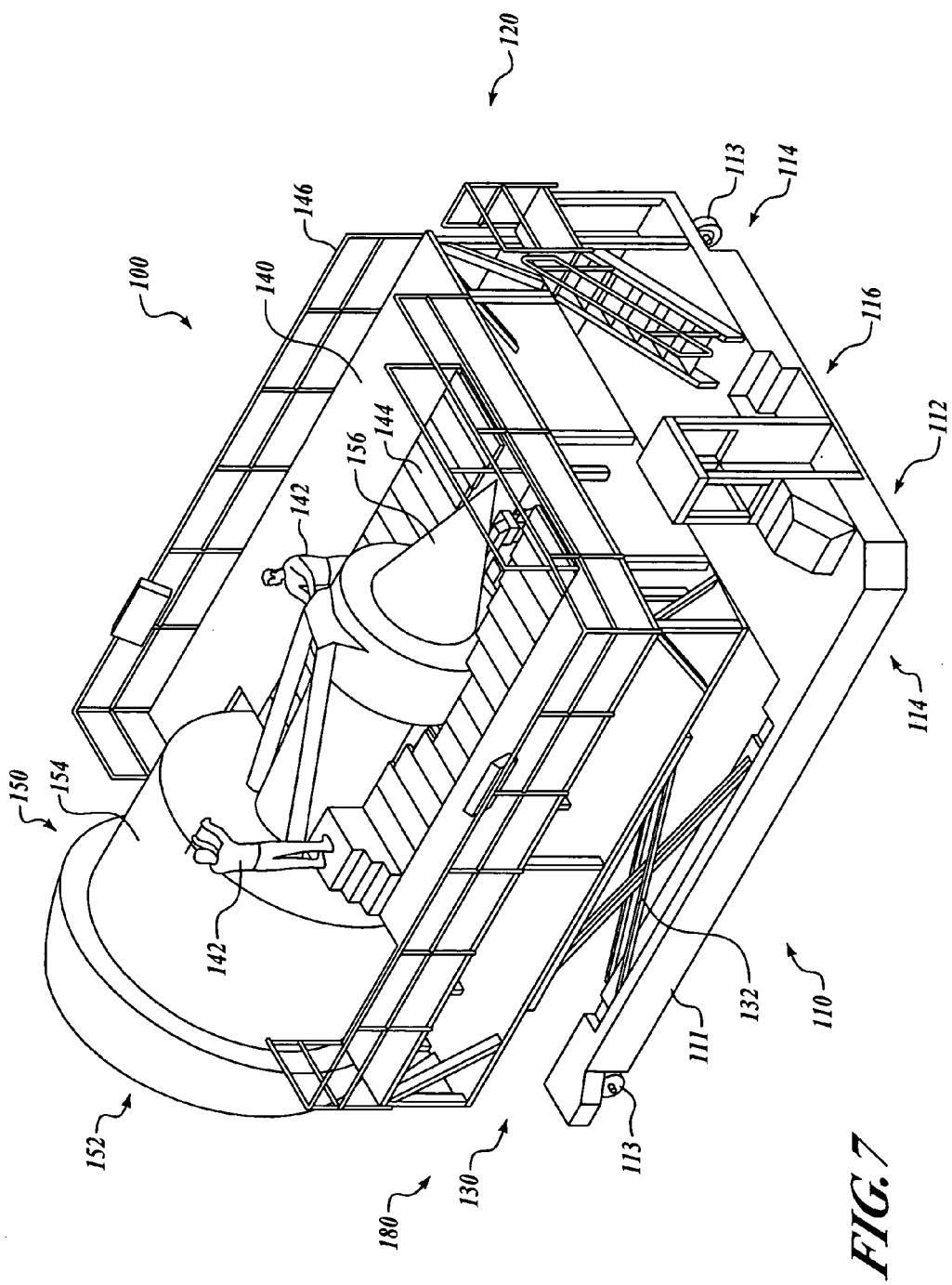
FIG. 7 is an enlarged isometric view of the engine loader and transport assembly of FIG. 1 engaged with the aircraft engine assembly in a servicing mode of operation.
Figure 8:
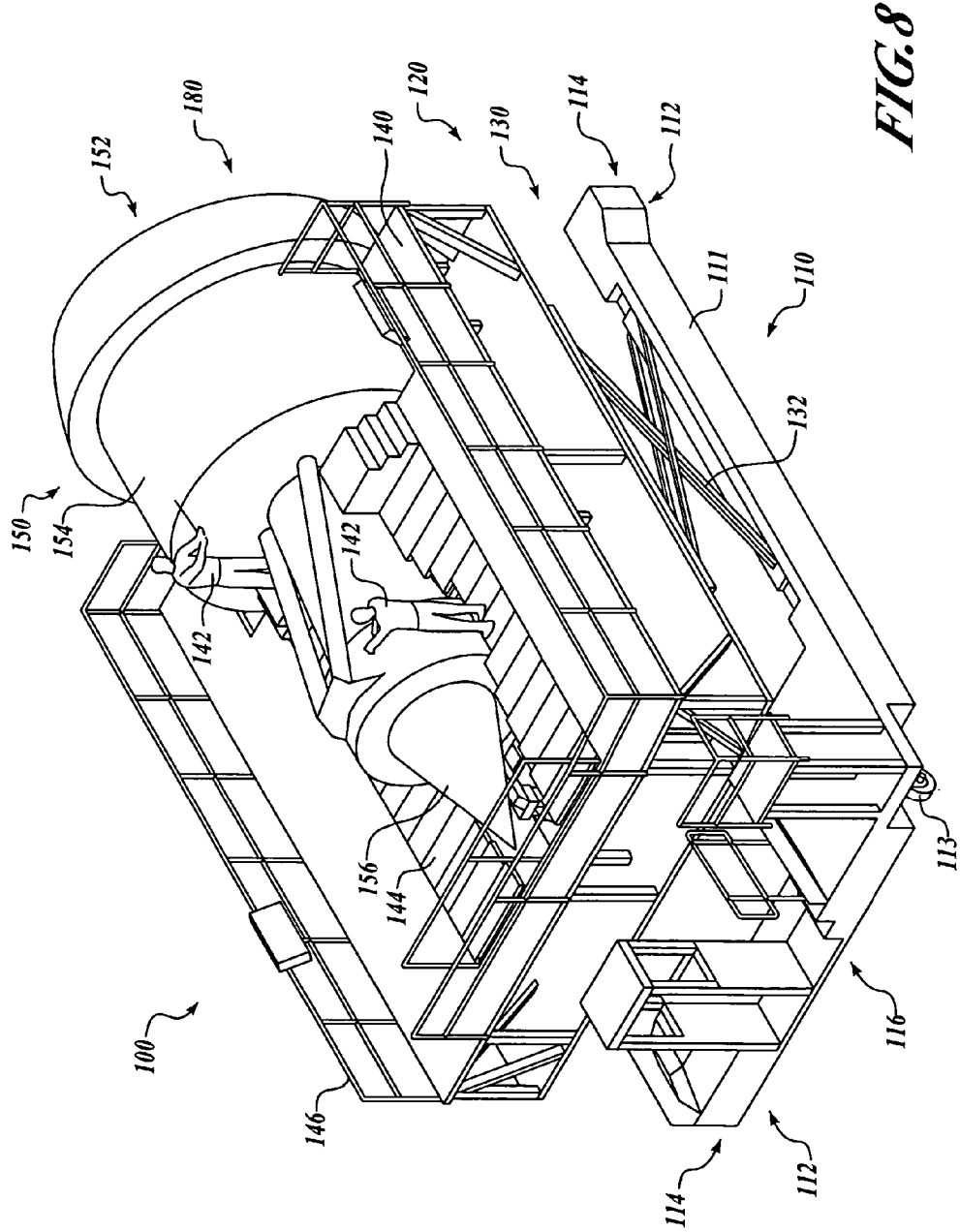
FIG. 8 is an alternate isometric view of the engine loader and transport assembly of FIG. 1 engaged with the aircraft engine assembly in the servicing mode of operation.
Figure 9:
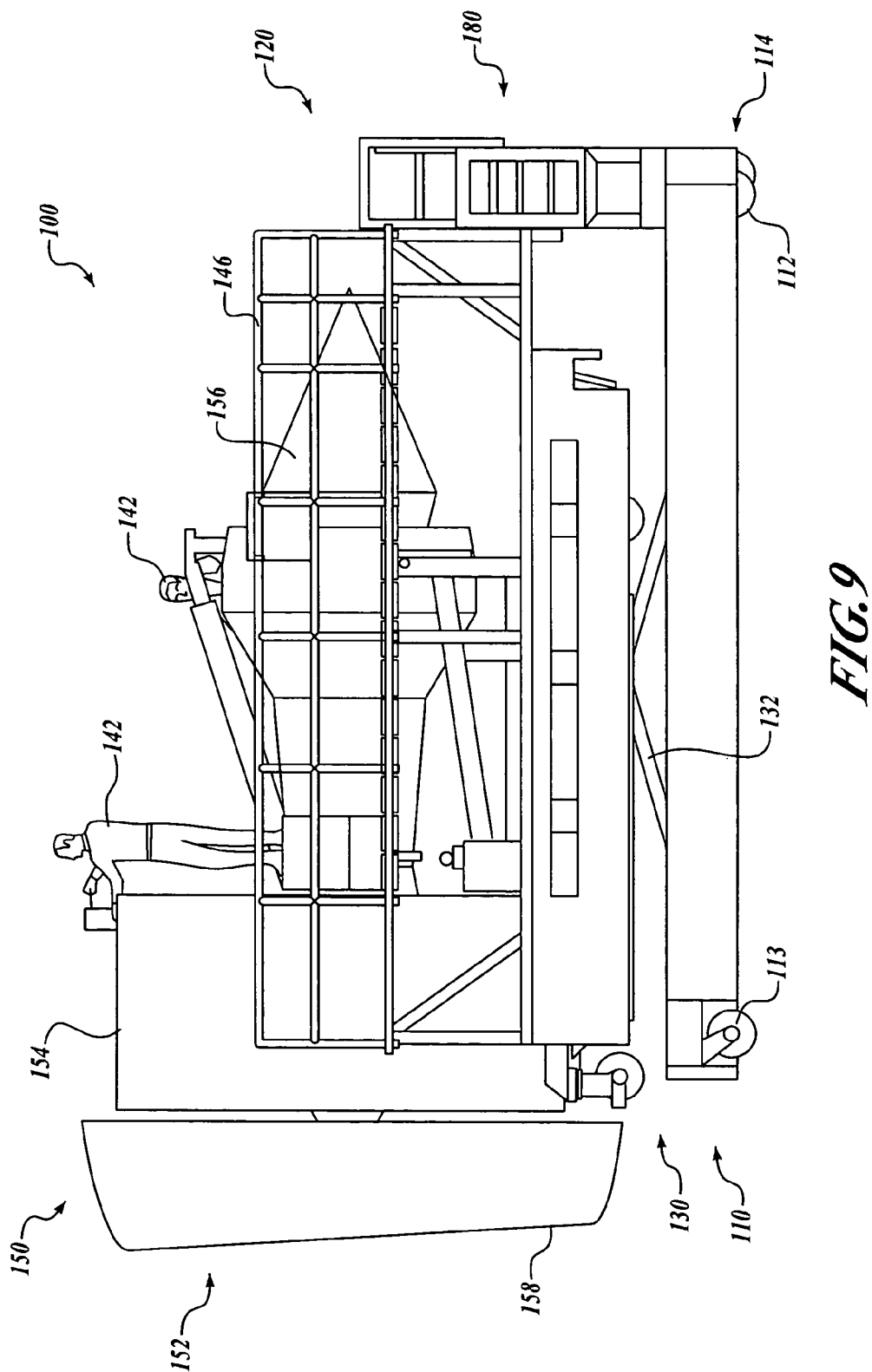
FIG. 9 is a side elevational view of the engine loader and transport assembly of FIG. 1 engaged with the aircraft engine assembly in the servicing mode of operation.

FIGS. 7 and 8 are isometric views, and FIG. 9 is a side elevational view, of the engine loader and transport assembly 100 of FIG. 1 engaged with the aircraft engine assembly 150 in a servicing mode of operation 180. In the servicing mode of operation 180, the aircraft engine assembly 150 is positioned in the working space 104, and not engine engagement unit 120 is coupled to the engine support 158. Furthermore, as shown in FIGS. 7–9, the lift assembly 130 of the engine engagement unit 120 is partially extended such that the aircraft engine assembly 150 is lifted from the floor surface 102, and the engine engagement unit 120 is spaced apart from the drive assembly 110. In this embodiment, the liftsassembly 130 includes a pair of scissor-lift mechanisms 132 positioned on opposing sides of the working space 104 and operatively coupled between the frame 111 of the drive assembly 110 and the engine engagement unit 120. In one embodiment, the scissor-lift mechanisms 132 may be independently controlled by the operator 106, thereby providing rotational control of the aircraft engine assembly 150.

With continued reference to FIGS. 7 and 8, in this embodiment, the engine engagement unit 120 includes an upper deck 140. The upper deck 140 is adapted to provide a suitable work surface for one or more technicians 142 while performing tasks on the aircraft engine assembly 150. A plurality of panels 144 are slidably coupled to the upper deck 140 which may be slidably extended inwardly into the working space 104 between the upper deck 140 and aircraft engine 152. A rail 146 is disposed about an outer perimeter of the upper deck 140.

The engine loader and transport assembly 100 in accordance with the present invention provides a self-contained, autonomous apparatus that enables a single operator 106 to pick up and transport aircraft engine assemblies 150. Thus, there is no need for external supply lines which provide electrical power or pressurized hydraulics to the drive assembly 110. Because the engine engagement unit 120 is adapted to be selectively coupled and de-coupled from the engine buck 158, the aircraft engine 152 may be moved and installed while mounted on the shipping buck 158 installed by the engine manufacturer.

The engine loader and transport assembly 100 may provide significant advantages over prior art apparatus and methods. For example, the process of removing installing aircraft engines may be greatly simplified in comparison with the prior art. Because the aircraft engine assembly 150 may be picked up and moved while installed on the engine buck 158, the need to remove the aircraft engine 152 from its shipping buck 158 prior to transport of the aircraft engine assembly is eliminated. There is also no need to transfer the aircraft engine 152 from a first transport device to the second lifting device to perform the desired installation on an airframe. Furthermore, because the drive assembly 110 may be operated in an automated or semi-automated manner, the loading and transporting of the aircraft engine 152 may be performed in a speedy, economical manner.

Another advantage provided by engine loader and transport assemblies in accordance with the present invention is that the need for overhead crane and sling assemblies are eliminated, enabling engine lifting and transporting functions to be performed in a wider variety of applications and environments. Engine loader and transport assemblies 100 in accordance with the present invention may operate in areas of reduced clearance that would not be sufficient to allow the operation of prior art overhead crane and sling assemblies. Furthermore, because the engine engagement unit 120 is coupled and decoupled with the aircraft engine assembly 150 from the lateral sides of the working space 104, there is no need to position a lifting assembly underneath the aircraft engine in order to perform the necessary lifting. This may provide a significant advantage in comparison with some prior art apparatus and methods which require increased clearance beneath the aircraft engine, and which may necessitate jacking or otherwise raising the airframe to a significant height in order to allow the prior art lifting mechanism to be installed.

It will be appreciated that a number of particular details of the engine loader and transport assembly 100 may be modified from the particular embodiments described above, and that the invention is not limited to the particular embodiments described above and shown in the accompanying figures. In the following discussion, for the sake of brevity, only significant differences between the alternate embodiments and the above-described embodiment will be discussed in detail.

Figure 10:
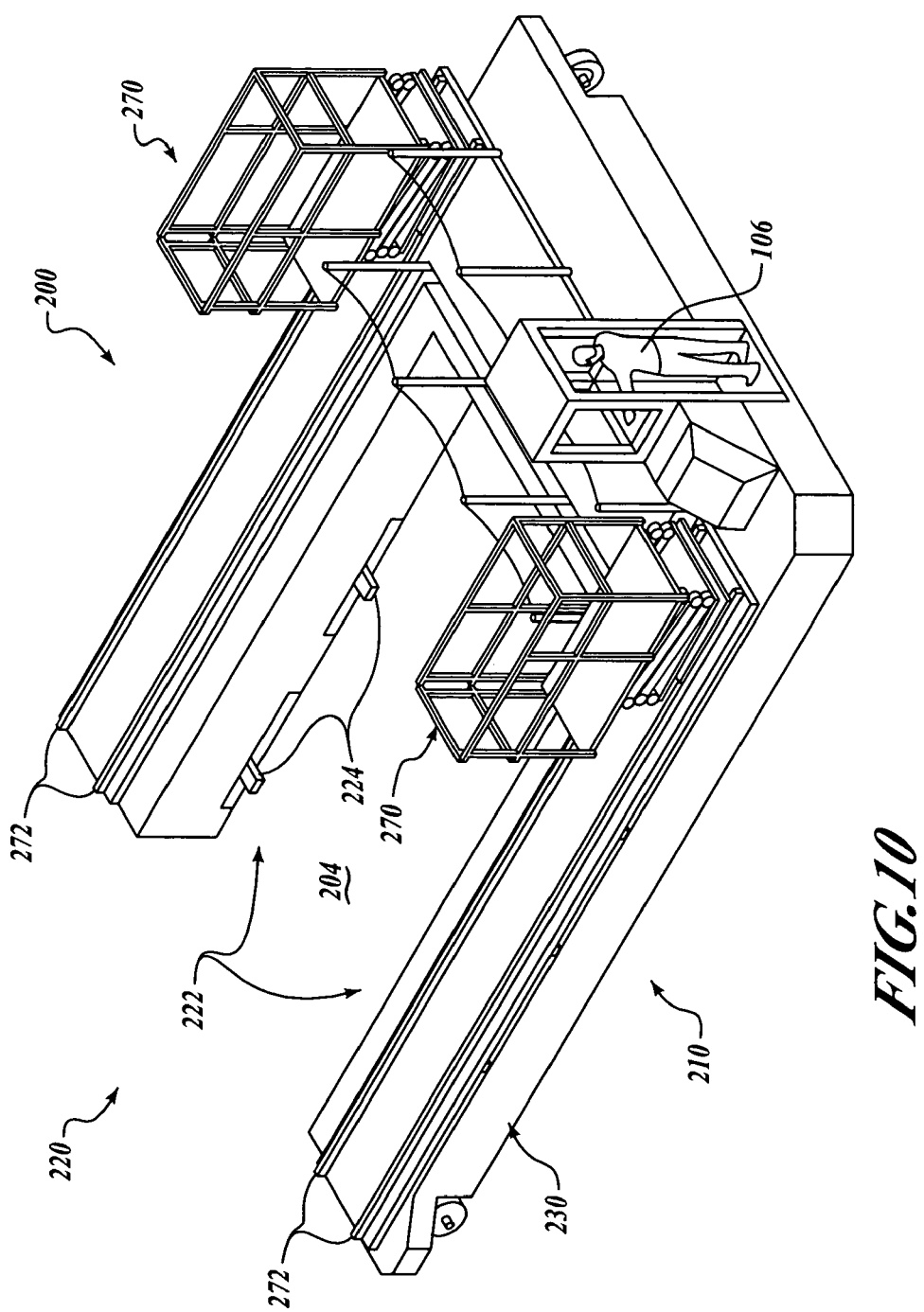
FIG. 10 is an isometric view of an engine loader and transport assembly in accordance with an alternate embodiment of the present invention.

FIG. 10 is an isometric view of an engine loader and transport assembly 200 in accordance with an alternate embodiment of the present invention. The engine loader and transport assembly 200 includes a drive assembly 210 and an engine engagement unit 220 movably coupled to the drive assembly 210 by a lift assembly 230. In this embodiment, the engine engagement unit 220 includes a pair of platform assemblies 270 movably mounted on tracks 272. The engine engagement unit 220 also includes a pair of coupling assemblies 222 having inwardly-projecting elongated members 224 positioned on opposing sides of the working space 204. In the manner described above, the engine engagement unit 220 may be coupled to aircraft engine assembly 150, thereby enabling the engine load or and transport assembly 200 to lift the aircraft engine assembly 150 and move it to a desired location.

Figure 11:
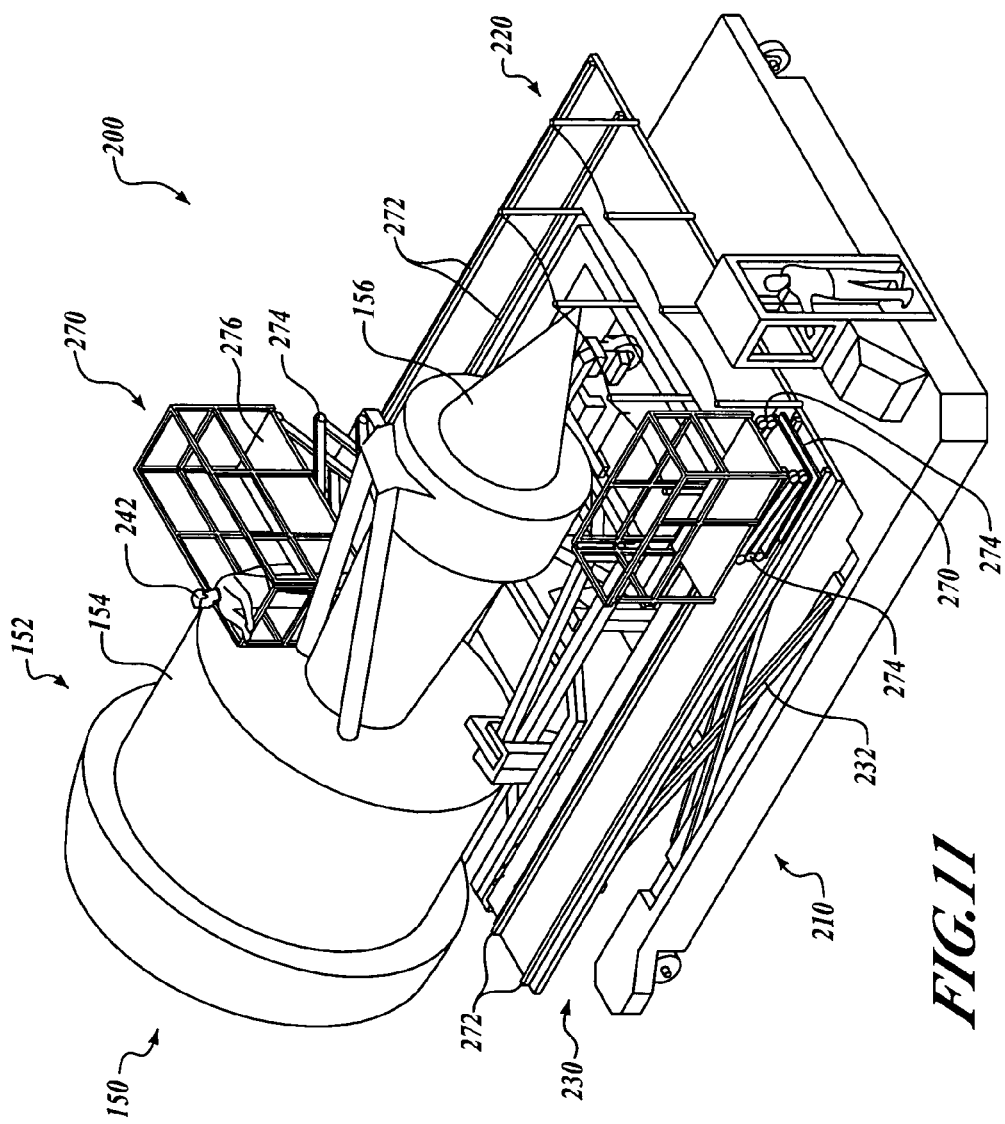
FIG. 11 an isometric view of the engine loader and transport assembly of FIG. 10 engaged with an aircraft engine assembly.
Figure 12:
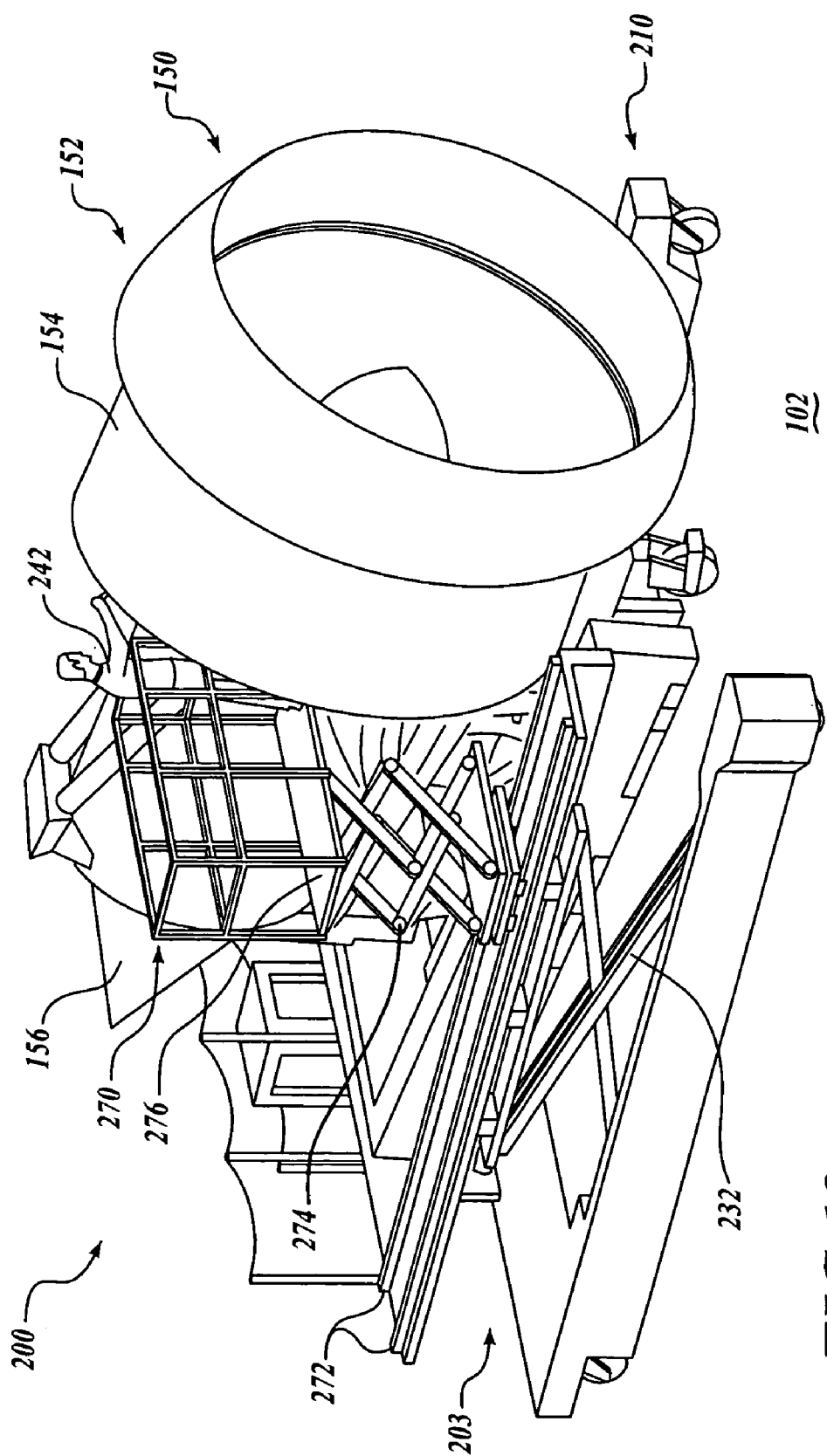
FIG. 12 is another isometric view of the engine loader and transport assembly of FIG. 10 engaged with an aircraft engine assembly.

FIGS. 11 and 12 are rear and front isometric views, respectively, of the engine loader and transport assembly 200 of FIG. 10 engaged with the aircraft engine assembly 150. In this position, the lift assembly 230 has been actuated to raise the aircraft engine assembly 150 off of the floor surface 102. As described above, the lift assembly 230 includes a pair of scissor-lift devices 232. Similarly, each of the platform assemblies 270 includes a pair of scissor-lift devices 274 for raising and lowering a work surface 276 to a proper height relative to the aircraft engine assembly 150. The work surface 276 may be a telescoping surface that may be controllably extended toward the aircraft engine assembly 150 to enable a technician 242 easy access to any desired portion of the aircraft engine 152.

The engine loader and transport assembly 200 provides the above-noted advantages over prior art apparatus and methods, and may also provide improved accessibility to the aircraft engine assembly 150. Since each platform assembly 270 may be independently raised and lowered on its own scissor-lift device 274, and may include a telescoping work surface 276, the platform assemblies 270 may provide improved access to difficult-to-reach portions of the aircraft engine assembly 150.

It will be appreciated that manufacturing and servicing facilities may be equipped with engine loader and transport assemblies in accordance with the present invention, and may be utilized to assemble and service a wide variety of aircraft. Embodiments of apparatus and methods in accordance with the present invention may used in the manufacturing and servicing of virtually any type of aircraft, and is not limited to any single aircraft type or any particular aircraft manufacturing facility. For example, engine loader and transport assemblies in accordance with the present invention may be used in the manufacturing, assembly, and servicing of a wide variety of commercial passenger aircraft, including, for example, the 737, 747, 757, 767, and 777 models commercially-available from The Boeing Company of Chicago, Ill. Furthermore, the apparatus and methods of the present invention may be applied to the manufacture, assembly, and servicing of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

FIG. 13 is a schematic view of a method 300 of installing an engine assembly onto an aircraft in accordance with another embodiment of the invention. The method 300 begins at a block 302. At a block 304, an aircraft airframe is positioned on a floor surface, such as a floor surface of an aircraft manufacturing or servicing facility. Next, an aircraft engine assembly is provided at a block 306. An aircraft engine handling assembly in accordance with an embodiment of the present invention is provided at a block 308. the engine handling assembly is positioned proximate the aircraft engine assembly such that the aircraft engine assembly is positioned at least partially within the working space at a block 310.

At a block 312, the coupling assemblies of the engagement unit are coupled with the aircraft engine assembly. As described above, the coupling assemblies may be coupled with an engine buck of the aircraft engine assembly. Alternately, the coupling of the coupling assemblies may include extending a pair of elongated members into engagement with a pair of corresponding slots disposed in the aircraft engine assembly, or may include engaging a pair of engagement members with at least one of a rail and a beam of an engine buck of the aircraft engine assembly.

As further shown in FIG. 13, the aircraft engine assembly is raised from the floor surface by spacing apart the engagement unit of the engine handling assembly from the drive assembly at a block 314. At a block 316, the aircraft engine assembly is moved into position proximate the airframe using the drive assembly. The aircraft engine assembly is then positioned in the final position for attachment to the aircraft at a block 318. The final positioning of the engine assembly may include, for example, raising and rotating the engine assembly using the lifting assembly, and translating the engine assembly using the drive assembly. As described above, the final positioning of the aircraft engine assembly (block 318) may include automatically positioning the aircraft engine assembly using a programmable control system of the lifting assembly to provide the required position characteristics (e.g. roll, pitch, yaw, etc.) for the particular aircraft installation in question. At a block 320, the aircraft engine assembly is attached to the airframe. The method 300 may further include decoupling the engagement unit from the aircraft engine assembly to block 322, and removing the engine buck from the aircraft engine assembly at a block 324.

FIG. 14 is a schematic view of a method 400 of removing an engine assembly from an aircraft (e.g. for servicing) in accordance with an alternate embodiment of the invention. The method begins at a block 402. At a block 404, the aircraft is positioned on a floor surface. An aircraft engine handling assembly in accordance with an embodiment of the present invention is provided at a block 406. The engine handling assembly is positioned proximate the engine assembly at a block 408, and at a block 410, the engagement unit of the engine handling assembly is positioned with respect to the drive assembly such that the engine assembly is at least partially positioned in the working space. Next, the coupling assemblies of the engagement unit are coupled with the engine assembly at a block 412. The engine assembly is detached from the aircraft at a block 414. At a block 416, the engine assembly is lowered by moving the engagement unit toward the drive assembly, and at a block 418, service may be performed on the engine assembly.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. An engine loader and transport assembly adapted to engage an aircraft engine assembly, comprising:
  a motorized drive assembly engageable with a floor surface;
  an engagement unit positioned proximate the drive assembly and partially surrounding a working space, the engagement unit including a pair of coupling assemblies positioned on opposing lateral sides of the working space that are adapted to be selectively coupleable to the aircraft engine assembly when the aircraft engine assembly is positioned at least partially within the working space, wherein the engagement unit includes an upper deck positioned proximate the aircraft engine assembly and adapted to support at least one person, wherein the upper deck includes at least one panel slideably extendible toward the working space; and
  a lifting assembly operatively coupled to the drive assembly and to the engagement unit and adapted to selectively raise and lower the engagement unit with respect to the floor surface.

2. The assembly of claim 1, wherein the drive assembly includes an electric motor and at least one drive wheel operatively coupled to the electric motor.

3. The assembly of claim 2, wherein the drive assembly further includes a programmable controller operatively coupled to at least one of the electric motor and the drive wheel.

4. The assembly of claim 1, wherein the engagement unit comprises a substantially U-shaped engagement assembly.

5. The assembly of claim 1, wherein at least one coupling assembly of the engagement unit includes a pair of elongated members, the elongated members being spaced apart along a respective one the opposing lateral sides of the working space and being adapted to be selectively extendable into and retractable from the working space.

6. The assembly of claim 5, wherein the elongated members are substantially similar in size and shape to a pair of lifting forks of a forklift.

7. The assembly of claim 1, wherein the coupling assemblies are adapted to be selectively coupled to and decoupled from an engine buck of the aircraft engine assembly.

8. The assembly of claim 1, wherein at least one coupling assembly of the engagement unit includes a pair of engagement members spaced apart along a respective one the opposing lateral sides of the working space, the engagement members being adapted to be selectively coupleable to at least one of a rail and a beam of an engine support of the aircraft engine assembly.

9. The assembly of claim 1, wherein the lilting assembly includes a pair of scissor-lift devices operatively positioned on opposing lateral sides of the working space.

10. An engine loader and transport assembly adapted to engage an aircraft engine assembly comprising:
   a motorized drive assembly engageable with a floor surface;
   an engagement unit positioned proximate the drive assembly and partially surrounding a working space, the engagement unit including a pair of coupling assemblies positioned on opposing lateral sides of the working space that are adapted to be selectively coupleable to the aircraft engine assembly when the aircraft engine assembly is positioned at least partially within the working space, wherein the engagement unit includes a pair of elongated track members positioned proximate the working space, and a platform assembly moveably mounted on the track members, the platform assembly being adapted to support at least one person; and
   a lifting assembly operatively coupled to the drive assembly and to the engagement unit and adapted to selectively raise and lower the engagement unit with respect to the floor surface.

11. The assembly of claim 10, wherein the platform assembly includes a work surface and a lifting device coupled between the work surface and the track members, the work surface being controllably extendable toward the working space.

12. A facility for performing at least one of manufacturing and servicing an aircraft, comprising:
   a floor surface; and
   an engine handling assembly adapted to engage an aircraft engine assembly, the engine handling assembly including:
      a motorized drive assembly engageable with the floor surface;
      an engagement unit positioned proximate the drive assembly and partially surrounding a working space, the engagement unit including a pair of coupling assemblies positioned on opposing lateral sides of the working space that are selectively coupleable to the aircraft engine assembly when the aircraft engine assembly is positioned at least partially within the working space, wherein the engagement unit includes an upper deck positioned proximate the aircraft engine assembly and adapted to support at least one person, wherein the upper deck includes at least one panel slideably extendible toward the working space; and
      a lifting assembly operatively coupled to the drive assembly and to the engagement unit and adapted to selectively raise and lower the engagement unit with respect to the floor surface.

13. The facility of claim 12, wherein the engagement unit comprises a substantially U-shaped engagement assembly.

14. The facility of claim 12, wherein at least one coupling assembly of the engagement unit includes a pair of elongated members, the elongated members being spaced apart along a respective one the opposing lateral sides of the working space and being adapted to be selectively extendable into and retractable from the working space.

15. The facility of claim 12, wherein the coupling assemblies are adapted to be selectively coupled to and decoupled from an engine buck of the aircraft engine assembly.

16. The facility of claim 12, wherein at least one coupling assembly of the engagement unit includes a pair of engagement members spaced apart along a respective one the opposing lateral sides of the working space, the engagement members being adapted to be selectively coupleable to at least one of a rail and a beam of an engine support of the aircraft engine assembly.

17. The facility of claim 12, wherein the lifting assembly includes a pair of scissor-lift devices operatively positioned on opposing lateral sides of the working space.

18. A facility for performing at least one of manufacturing and servicing an aircraft, comprising:
   a floor surface; and
   an engine handling assembly adapted to engage an aircraft engine assembly, the engine handling assembly including:
      a motorized drive assembly engageable with the floor surface;
      an engagement unit positioned proximate the drive assembly and partially surrounding a working space, the engagement unit including a pair of coupling assemblies positioned on opposing lateral sides of the working space that are selectively coupleable to the aircraft engine assembly when the aircraft engine assembly is positioned at least partially within the working space, wherein the engagement unit includes a pair of elongated track members positioned proximate the working space, and a platform assembly moveably mounted on the track members, the platform assembly being adapted to support at least one person; and
      a lifting assembly operatively coupled to the drive assembly and to the engagement unit and adapted to selectively raise and lower the engagement unit with respect to the floor surface.

19. The facility of claim 18, wherein the platform assembly includes a work surface and a lifting device coupled between the work surface and the track members, the work surface being controllably extendable toward the working space.

20. A method of attaching an aircraft engine, comprising:
   positioning an airframe of the aircraft on a floor surface;
   providing an aircraft engine assembly;
   providing an engine handling assembly having a motorized drive assembly and an engagement unit operatively coupled to the motorized drive assembly, the drive assembly and the engagement unit being adapted to partially surround a working space, the engagement unit including a pair of coupling assemblies positioned on opposing lateral sides of the working space, wherein the engagement unit includes at least one of:
  an upper deck positioned proximate the aircraft engine assembly and adapted to support at least one person, the upper deck having at least one panel slideably extendible toward the working space; and
  a pair of elongated track members positioned proximate the working space, and a platform assembly moveably mounted on the track members, the platform assembly being adapted to support at least one person;
positioning the engine handling assembly proximate the aircraft engine assembly with the aircraft engine assembly at least partially positioned in the working space;
coupling the coupling assemblies of the engagement unit with the aircraft engine assembly;
raising the aircraft engine assembly by spacing apart the engagement unit from the drive assembly;
moving the aircraft engine assembly into position proximate the airframe using the drive assembly; and
coupling the aircraft engine assembly to the airframe.

21. The method of claim 20, wherein coupling the coupling assemblies of the engagement unit with the aircraft engine assembly includes coupling the coupling assemblies with an engine buck of the aircraft engine assembly.

22. The method of claim 20, wherein coupling the coupling assemblies of the engagement unit with the aircraft engine assembly includes extending a pair of elongated members into engagement with a pair of corresponding slots disposed within the aircraft engine assembly.

23. The method of claim 20, wherein coupling the coupling assemblies of the engagement unit with the aircraft engine assembly includes engaging a pair of engagement members with at least one of a rail and a beam of an engine buck of the aircraft engine assembly.

24. The method of claim 20, wherein raising the aircraft engine assembly by spacing apart the engagement unit from the drive assembly includes actuating a lifting assembly operatively coupled to the engagement unit and to the drive assembly.

25. The method of claim 20, wherein actuating the lifting assembly includes actuating a pair of scissor-lift devices.

26. The method of claim 20, further comprising, after coupling the aircraft engine assembly to the airframe, decoupling the engagement unit from the aircraft engine assembly.

27. The method of claim 20, further comprising, after coupling the aircraft engine assembly to the airframe, removing an engine buck from the aircraft engine assembly.

28. A method of servicing an engine assembly of an aircraft, comprising:
  positioning the aircraft on a floor surface;
  providing an engine handling assembly having a motorized drive assembly and an engagement unit operatively coupled to the motorized drive assembly, the drive assembly and the engagement unit being adapted to partially surround a working space, the engagement unit including a pair of coupling assemblies positioned on opposing lateral sides of the working space, wherein the engagement unit includes at least one of:
    an upper deck positioned proximate the aircraft engine assembly and adapted to support at least one person, the upper deck having at least one panel slideably extendible toward the working space; and
  a pair of elongated track members positioned proximate the working space, and a platform assembly moveably mounted on the track members, the platform assembly being adapted to support at least one person;
  positioning the engine handling assembly proximate the engine assembly;
  raising the engagement unit of the engine handling assembly with respect to the drive assembly such that the engine assembly is at least partially positioned in the working space;
  coupling the coupling assemblies of the engagement unit with the engine assembly;
  detaching the engine assembly from the aircraft;
  lowering the engine assembly by moving the engagement unit toward the drive assembly; and
  performing service on the engine assembly.

29. The method of claim 28, wherein coupling the coupling assemblies of the engagement unit with the aircraft engine assembly includes attaching an engine buck to the engine assembly and coupling the coupling assemblies to the engine buck.

30. The method of claim 28, wherein coupling the coupling assemblies of the engagement unit with the engine assembly includes extending a pair of elongated members into engagement with a pair of corresponding slots disposed within the engine assembly.

31. The method of claim 28, wherein coupling the coupling assemblies of the engagement unit with the engine assembly includes attaching an engine buck to the engine assembly and engaging a pair of engagement members with at least one of a rail and a beam of the engine buck.

* * * * *